United States Patent [19]

Hierholzer, Jr. et al.

[11] 4,433,233
[45] Feb. 21, 1984

[54] SILICON CARBIDE HEATING ELEMENTS

[75] Inventors: Frank J. Hierholzer, Jr., Florissant; John A. Ancona, Affton; Gerald L. Shelton, St. Louis, all of Mo.

[73] Assignee: Emerson Electric Co., St. Louis, Mo.

[21] Appl. No.: 314,102

[22] Filed: Oct. 23, 1981

Related U.S. Application Data

[60] Division of Ser. No. 79,424, Sep. 27, 1979, Pat. No. 4,328,529, which is a division of Ser. No. 832,555, Sep. 12, 1977, Pat. No. 4,302,508, which is a continuation of Ser. No. 513,729, Oct. 10, 1974, abandoned.

[51] Int. Cl.$^3$ .............................................. H05B 3/10
[52] U.S. Cl. ............................ 219/553; 219/121 LM; 219/270; 338/281; 338/287; 338/330; 361/266; 373/134; 427/50; 428/367
[58] Field of Search .......... 219/270, 121 LM, 121 LF, 219/552, 553; 338/262, 287, 280, 281, 330, 331; 361/264, 265, 266; 373/134; 427/50; 428/367

[56] References Cited

U.S. PATENT DOCUMENTS

| | | | |
|---|---|---|---|
| 1,849,288 | 3/1932 | Fahrenwald | 338/281 X |
| 1,906,963 | 5/1933 | Heyroth | 338/330 |
| 2,001,297 | 5/1935 | Boyles | 338/330 |
| 2,095,253 | 10/1937 | Heyroth | 361/264 |
| 2,992,959 | 7/1961 | Schrewelius | 338/330 X |
| 3,321,727 | 5/1967 | Schrewelius | 338/330 |
| 3,764,776 | 10/1973 | Hierholzer et al. | 219/121 LM |
| 3,875,476 | 4/1975 | Crandall et al. | 338/330 |
| 3,875,477 | 4/1975 | Fredriksson et al. | 361/264 |

*Primary Examiner*—Volodymyr Y. Mayewsky
*Attorney, Agent, or Firm*—Polster, Polster and Lucchesi

[57] ABSTRACT

An electrical resistance heater or igniter characterized by having a core bonded by regrowth of silicon carbide is produced by heating particulate silicon carbide which may be mixed with a minor amount of modifying agent, by means of an uncharged beam of energy, to a temperature above 3000° F. and below 5500° F. and subsequently cooling the resultant coherent shape below 3000° F., both stops being completed within a period of ten minutes. In the preferred method, unconsolidated particulate silicon carbide is exposed to the energy of a laser beam and the particulate silicon carbide has a particle size within the range of magnitude of ten to three hundred microns. Upon its initial formation, the shape or element has a core and a distinctly delineated rind which is attached to the core. The core has a relatively low resistivity as compared with the rind. In an igniter formed by the use of a laser, the rind, which appears to be bonded together by quartz rather than by the regrowth of silicon carbide which characterizes the core, is removed, and the core, formed through at least a part of its reach in a serpentine pattern, is densified. The core has a valley or groove formed in it as it is being made, which extends through the surface upon which the laser beam impinges and has characteristically distinct regions along the walls defining the valley or groove. The valley or groove, being formed as the shape or element is formed by the laser, is continuous and follows the configuration of the surface of the shape or element through which the groove or valley opens.

13 Claims, 8 Drawing Figures

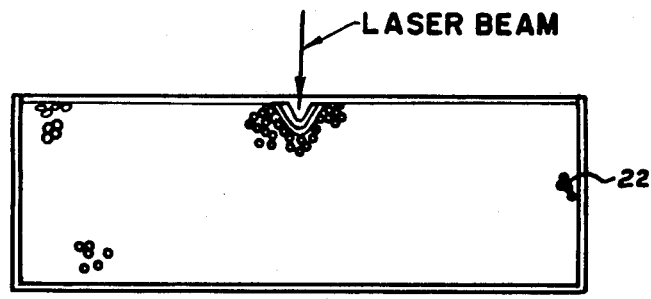
FIG. 1.
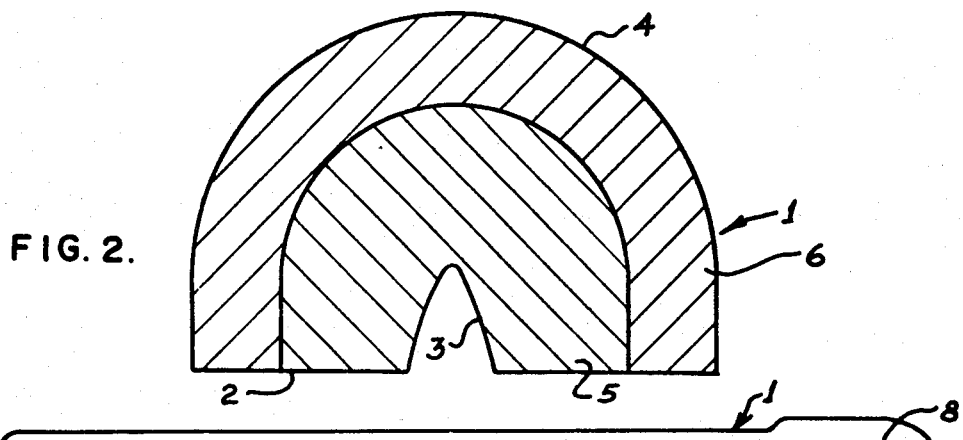
FIG. 2.
FIG. 3.
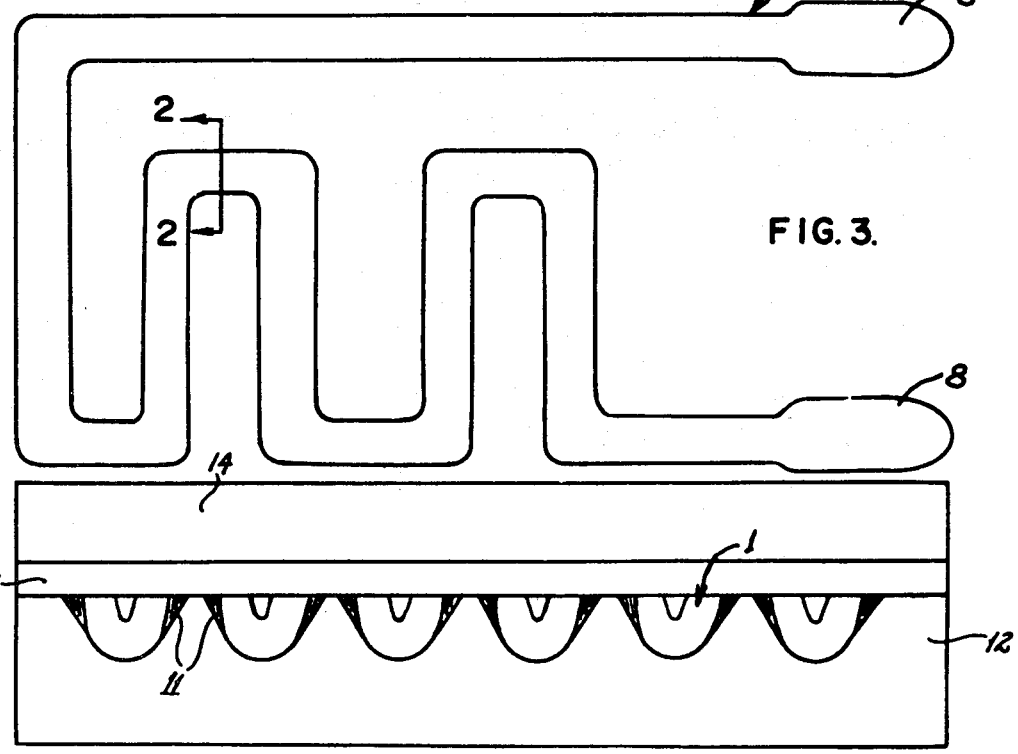
FIG. 4.

SILICON CARBIDE HEATING ELEMENTS

CROSS-REFERENCE TO RELATED APPLICATIONS

This application is a divisional of application Ser. No. 79,424, filed Sept. 27, 1979, now U.S. Pat. No. 4,328,529, which is a divisional of application Ser. No. 832,555, filed Sept. 12, 1977, now U.S. Pat. No. 4,302,508, which is a continuation of application Ser. No. 513,729, filed Oct. 10, 1974, now abandoned.

Application Ser. No. 513,729 is related to and contains subject matter common to applications by applicants Hierholzer and Ancona as follows:

Ser. No. 229,789, filed Feb. 28, 1972, now U.S. Pat. No. 3,764,776;

Ser. No. 355,574, filed Apr. 30, 1973, now abandoned, a division of application Ser. No. 229,789; and Ser. No. 330,486, filed Feb. 8, 1973, now abandoned, a continuation in part of application Ser. No. 229,789, and constitutes a continuation, as to common subject matter, of all of said applications, and as to new matter, a continuation in part thereof, new matter relating to the igniter embodiment being the joint invention of Hierholzer, Ancona and Shelton.

BACKGROUND OF THE INVENTION

This invention relates to unique coherent shapes or elements of silicon carbide in which silicon carbide is the predominant component, and method of producing them. The term "shape" is used in the dictionary sense of "a thing having a particular form or figure." The term "element" is used to mean the same thing, the term "element" being a more commonly used one than the term shape. The invention will be described in conjunction with the production of heater elements and igniters.

Silicon carbide rods for resistance elements are available commercially, as are silicon carbide igniters. One method for making them is by forming a rod of silicon carbide, silicon and carbon, consolidated by pressure, in an unfired state. The rods are packed in carbon and put in a furnace for sintering to lower the resistance of the rod. An example of such a method is set out in U.S. Pat. No. 2,897,572. The process requires a time span measured in hours, is cumbersome, expensive and not adapted to the production of light and complicated shapes of precisely controlled resistance. Silicon carbide igniters known heretofore have been cut from rods or tubes of silicon carbide made in the conventional way.

The preferred embodiments of shapes of this invention for use as heater elements to be operated at relatively low temperatures are made of doped silicon carbide and an electrical resistivity modifying agent, generally an electrically insulative refractory material such as aluminum oxide, molybdenum disilicide, magnesium fluoride, magnesium chloride, or magnesium titanate or some combination thereof. In the production of the preferred embodiment of igniters, doped silicon carbide powder is admixed for the hot zone of the igniter with silicon powder which is later converted to silicon carbide, and for a contact zone, with aluminum powder and silicon powder.

In any event, when the shape is formed by the preferred method of this invention in which a laser is used, the shape is characterized by having a core with a distinctive valley or grooves in it, the core being bonded by regrowth of silicon carbide, and a distinctly delineated rind adhered to the core but removable therefrom, the rind being bonded by the formation of quartz.

The term "doped" as applied to silicon carbide is used herein in the commercially accepted sense in the semiconductor art to mean treated with a very small amount (less than 1% by weight) of a material which renders the silicon carbide semi-conductive. The silicon carbide can either be of the type known commercially as green grit, with an n-type dopant such as nitrogen, or black grit, with a p-type dopant such as aluminum.

The shapes or elements of this invention may be non-linear of complicated configuration or varying cross-section, or both, and with various reaches of the top surface lying in different planes or in substantially the same plane. In the latter case, they can be used in applications for which silicon carbide elements have never heretofore been used, such as range burner elements. In addition, depending upon the amount and character of electrical resistivity modifying agents in the composition, the shapes or elements lend themselves to use as thermal sensors or thermistors. They may be made either uniform or non-uniform in composition through their length.

One of the objects of this invention is to provide silicon carbide shapes of a character heretofore unknown.

Another object is to provide such shapes in configurations and for purposes not heretofore possible.

Another object is to provide a method for producing such shapes quickly, easily, and economically.

Other objects will become apparent to those skilled in the art in the light of the following description and accompanying drawings.

SUMMARY OF THE INVENTION

In accordance with this invention, generally stated, a coherent shape is produced by heating particulate silicon carbide or a mixture of silicon carbide and electrical resisitivity modifying material to a temperature above 3000° F. and below 5500° F. by means of an uncharged beam of energy and subsequently cooling the shape below 3000° F., both steps being completed within a period of ten minutes. Preferably the heating is accomplished by the impingement of a laser upon the surface of unconsolidated powder, the laser beam dwell at any area of impingement being less than thirty seconds.

The shape which results from this preferred method is coherent, has a core with a relatively low resistivity and a distinctly delineated, adhered but removable rind of relatively high resistivity when the shape is first produced. The core has a distinct and distinctive valley or groove in it, and the core is characterized by being bonded by the regrowth of silicon carbide, while the rind is bonded chiefly by quartz.

In the formation of shapes for use as range elements or thermistors, varying amounts of electrical resistivity modifying materials are mixed with the particulate silicon carbide from which the shapes are made.

In making shapes used for igniters, the bed of particulate silicon carbide is divided to provide a hot zone area and a contact area. In the preferred embodiment, an area in which a mixture of silicon carbide powder and silicon powder is positioned forms the hot zone, while a mixture of aluminum powder, silicon powder and silicon carbide powder is positioned to form the contact zone, within which contacts may be embedded during the forming process. In making an igniter, the rind, which serves a strengthening function during the early stage of the manufacture is removed, and the igniter is densified.

BRIEF DESCRIPTION OF THE DRAWINGS

In the drawings, FIG. 1 is a somewhat schematic view of a bed of particulate silicon carbide-aluminum oxide composition upon which a laser beam is impinging to form a shape of this invention;

FIG. 2 is a greatly enlarged sectional view taken along the line 2—2 of FIG. 3, of a shape of this invention;

FIG. 3 is a bottom plan view of one embodiment of shape of this invention;

FIG. 4 is a sectional view of a shape of this invention mounted to function as a heating element for a domestic range or the like;

DESCRIPTION OF THE PREFERRED EMBODIMENT

Figure 5:
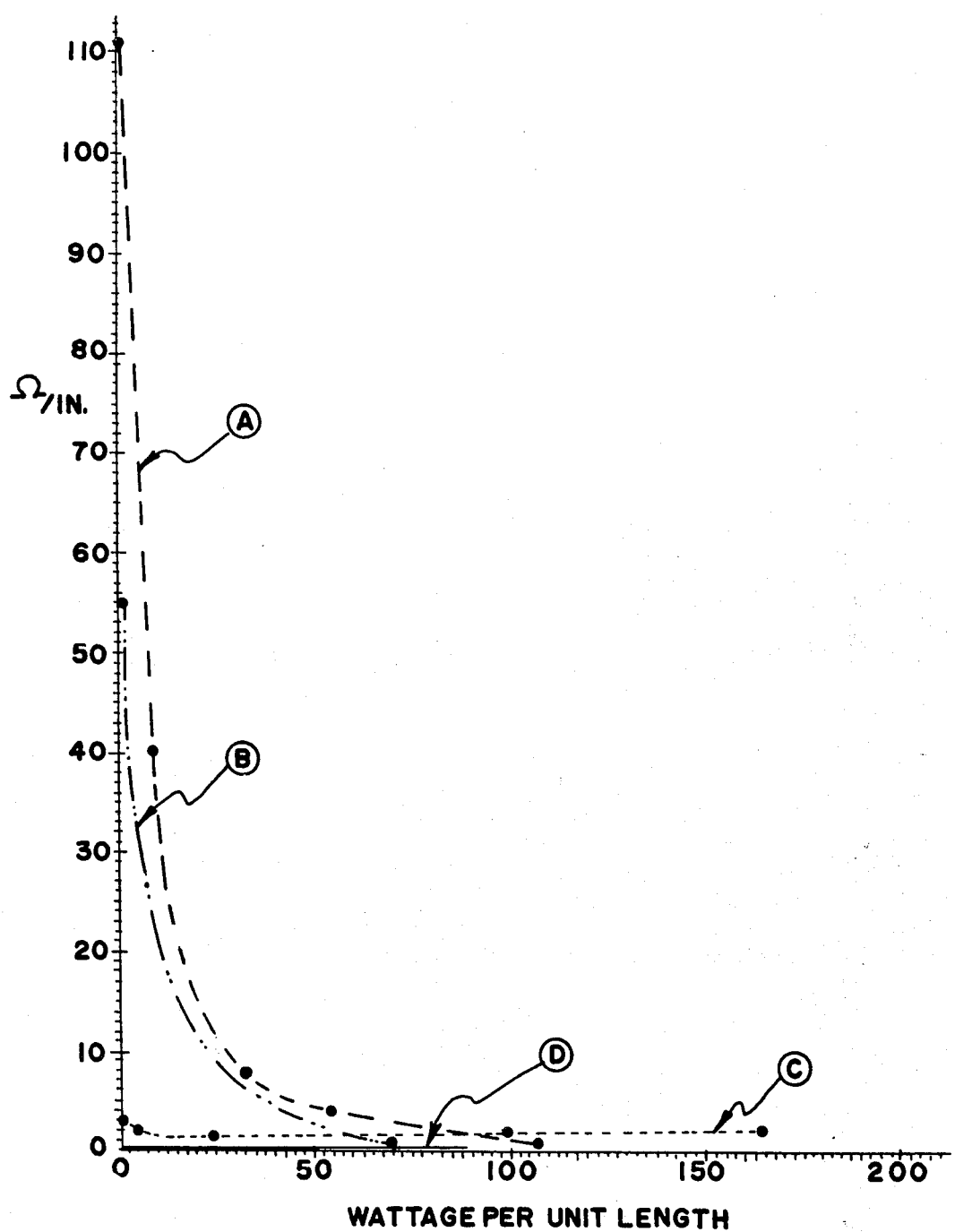
FIG. 5 is a graph illustrating the general magnitude of resistivity and change of resistance with temperature of shapes containing different proportions of silicon carbide and aluminum oxide.

Referring now to the drawings, and particularly to FIGS. 2 and 3, reference numeral 1 indicates one embodiment of shape of this invention, designed to be used as an electric range heating element. The essential component of shape 1 is silicon carbide. In the preferred embodiment shown, the shape is substantially flat on its upper surface 2, except for a valley or groove 3 in its center, and is transversely arcuate on its outer surface 4. The shape 1 has a clearly delineated core 5 and rind 6. The valley 3 runs the length of the shape, in the core 5. The core 5 has a low resistivity compared with the rind 6. The rind 6, in the preferred embodiment, adheres to the core 5, but is separable from it.

Referring now to FIG. 3, the shape of this embodiment is made with an enlarged section 8 at each end, to provide relatively cool terminals for connection to electric conductors. In use, the rind 6 may be removed from as much of the terminal section 8 as is necessary or desirable to permit the fully exposed core to be metallized and an electrical conductor to be electrically connected, or the rind can be left on and the upper, exposed surface of the core can be metallized or otherwise made receptive to electrical connection.

Referring now to FIG. 4, the shape 1 of this invention, with a multiplicity of closely spaced reaches, is shown mounted with the aid of an inorganic high temperature adhesive 11 in a supporting bed of high temperature refractory material 12, such as zirconium oxide, magnesium oxide, alumina or the like, covered with a relatively thin coating of refractory 13 such as zirconium oxide, magnesium oxide, alumina or the like, which in turn is covered with a crystallizable glass plate 14, such as is commercially available under the trademark HERCUVIT, a product of PPG Industries, Inc. Such a "laminated" device can be used as a burner for one of the new countertop domestic ranges, for example, the Hercuvit plate extending beyond the element to form the top of the range. This example is merely illustrative of a possible means for using the heating element as a burner.

The element 1 is coherent and self-supporting. It is extremely resistant to thermal shock. The shapes, used as heating elements, can be operated up to 2800° F.

Unlike the elements formed by the prior art systems, in which the heating element resistance from one element to another may vary by plus or minus 100%, the preferred, laser-formed elements of this invention appear to vary no more than about plus or minus 20%. With proper feedback techniques, this control can be even more accurate.

In general, the preferred method of making the element 1 includes the putting of a commercial grade, unconsolidated silicon carbide powder, the minimum particle size being greater than 10 microns and the maximum less than 300 microns, as, for example, 320 mesh, with or without electrical resistivity modifying material, into an open-topped container and leveling the top surface. The container containing the bed of particulate material is then placed on a x-y table, under a laser in the ordinary room atmosphere. The x-y table is programmed to move, in the illustrative embodiment shown in FIG. 3, in a path coinciding with the long axis of the reaches of the element 1.

The laser used in producing the shape 1 is a carbon dioxide laser producing energy at a wave length of 10.6 microns, operating at 300 watts CW with a lens which gives a broad depth of focus and a spot about 0.05 inch in diameter. The laser is oriented so that the laser beam strikes the surface of the bed perpendicularly. The beam and bed, in forming the shape shown in FIG. 3, are moved relative to one another from one end at a speed of about half an inch per minute until an enlarged terminal section 8 is formed, whereupon the speed is increased to about one inch per minute, through the length of the element and in the pattern shown, until the beam and bed have reached the point at which the other terminal section 8 is to be formed, whereupon the relative motion is slowed to about half an inch per minute to form the second terminal section.

In using a laser to produce the element, the beam must be of a wave length which is readily absorbed by silicon carbide. While other lasing materials will give differing results which will be a function of the match between the laser beam wave length and the silicon carbide absorption wave length, the 10.6 micron wave length of the carbon dioxide laser has been found to be quite satisfactory.

The shape, with core 5 and rind 6, can simply be lifted from the bed, fully formed. Loose powder can be brushed off, and as much of the rind removed as desired, as has been indicated. The rind does provide a built-in thermal and electrical insulating layer, and is therefore quite useful in many applications. The exposed terminal parts of the core can be metallized or otherwise made receptive to electrical connection, and the element is ready for mounting as a heating element.

The beam symmetry and uniformity of travel in every direction of the beam and bed relative to one another have much to do with the electrical characteristics of the finished element of whatever shape, especially because the time increments involved are short. It is desirable to use a symmetrical beam and accurately to control the movement of beam and bed with respect to one another.

In order to increase the resistivity of the core element, to produce, where it is desired, a positive temperature coefficient of resistance, and in some instances to produce a stronger shape or shapes used as range heating elements or as thermistors, it is desirable to add electrical resistivity modifying agents.

One example is aluminum oxide. A small percentage of the total weight of the mixture of aluminum oxide increases the resistivity of the elements markedly. Thus, the addition of 3% alumina increases the resistivity of the core a hundredfold at room temperature. The resistance increases with increase in the percentage of aluminum oxide up to 10% by weight. At a concentration of 25% by weight of alumina, the temperature coefficient of resistance is positive. However, shapes containing large percentages of alumina are brittle and more fragile than those containing zero to ten percent alumina.

The resistance characteristics of typical resistance elements with different proportions of alumina and silicon carbide are illustrated graphically in FIG. 5 wherein resistance in ohms per inch is plotted against wattage, of which heat is a function. Line A represents the characteristics of an element made up of 90% nitrogen doped (green grit) 240 grit silicon carbide and 10% 100 mesh alumina; line B, 83.3% nitrogen doped (green grit) 240 grit silicon carbide and 16.7% alumina; and line C, 97% nitrogen doped (green grit) 240 grit silicon carbide and 3% alumina. Line D represents the characteristics of three different elements, one containing 100% nitrogen doped (green grit) 240 grit silicon carbide; one containing 99% nitrogen doped (green grit) 240 grit silicon carbide and 1% 100 mesh alumina, and one containing 75% nitrogen doped (green grit) 240 grit silicon carbide and 25% 100 mesh alumina. There are differences between elements made from each of the three line D mixes but the vertical scale used makes it impossible to show in this graph.

The results with commercial aluminum doped (black grit) silicon carbide are substantially the same as with the green grit. Commercially available aluminum doped silicon carbide is reported to contain in the neighborhood of 0.34% aluminum. The electrical resistance per unit of length for an element of given cross-section will probably vary with the amount and type of dopant, e.g., other p-dopants such as boron, gallium and indium or other n-dopants such as phosphorous, arsenic or antimony. However, the initial resistance characteristics of each of the variously doped silicon carbides are easily determined, and the formation and general characteristics of the elements of this invention using variously doped silicon carbides will be essentially the same.

It has also been found that the grit sizes are of considerable importance. When less than 10% alumina is present the physical characteristics of the element are largely determined by the grit size of the silicon carbide for a given laser beam strength and particularly when a carbon dioxide laser is used, because the absorption by the silicon carbide of the beam energy at a wave length of 10.6 microns is excellent. By way of example, the following illustrations of the use of 800 grit, 500 grit, 240 grit and 80 grit powders involve doped silicon carbide alone, but they are indicative of the results obtained with a mixture of doped silicon carbide and a minor proportion of alumina.

800 grit commercial aluminum doped silicon carbide powder with a maximum particle size of about 30 microns, a minimum particle size of about 5 microns, and an average size of about 12 microns, produces, with a carbon dioxide laser operated at 250–300 watts CW, a 0.05–0.08 inch diameter spot, and varying relative speeds, shapes of poor coherence, unsuitable for use as a heating element.

500 grit commercial aluminum doped silicon carbide powder, with a maximum size of about 40 microns, a minimum size of about 10 microns, and an average size of about 19 microns, produces an excellent heating element, with a sharp line of demarcation between the high resistivity rind and the low resistivity core. Made at a relative speed of one inch per minute, with a laser operated at 300 watts CW and a beam of 0.05 inch spot size, the core has a resistivity of 0.19 ohms per linear inch.

240 grit commercial aluminum doped silicon carbide powder, with a maximum size of about 85 microns, a minimum size of about 25 microns and an average size of about 50 microns, produces, with a laser operated at 300 watts CW, with a beam of 0.05 spot size and a table speed of one inch per minute, a heating element with a core resistivity of 0.14 ohms per linear inch. The demarcation between the low resistance rind and the high resistance core is not as clearly defined as it is in the element made with 500 grit powder, although it is still delineated.

Under the same conditions of formation, 80 grit commercial aluminum doped silicon carbide powder, with a maximum particle size of about 292 microns, a minimum of about 102 microns, and an average of about 165 microns, produces a heating element which is irregular in cross section and lacks strength as compared with the elements made of 240 grit material. The line of demarcation between the core and rind is not well defined. The element has a resistivity of 0.18 ohms per linear inch. The 80 grit particle size requires more than 300 watts CW from a carbon dioxide laser with the 0.05 inch spot size in order to be uniform in cross-section at the one inch per minute table speed. A higher-power carbon dioxide laser would form larger cross-section silicon carbide heating elements from the 80 grit silicon carbide particles thereby making this size useful. However, because present commercially available "off-the-shelf" lasers are limited to about 300 watts, the 80 grit silicon carbide material is too large for optimum results with commonly available lasers.

For a given proportion of alumina, the electrical resistance per unit of length for an element of given cross section is largely set by the resistivity of the starting silicon carbide. Heavily doped silicon carbide particles will give a lower resistance per unit length in the resulting heating element than lightly doped silicon carbide particles. However, commercially, the aluminum doped silicon carbide powder is heavily doped, and the resulting heating element has relatively low resistance per unit length. This heavy doping also results in a positive temperature coefficient and stability during high temperature operation for elements containing 0–1% alumina. Heating elements made using the 240 grit silicon carbide particles with no alumina had a positive temperature coefficient of resistance of 250 parts per million per degree Fahrenheit at 2000° F. operating temperature. The resistance of the rind in any event is on the order of above $10^6$ ohms/inch at room temperature.

The heating elements produced by a laser beam under the conditions described above have been made in widths from less than ⅛ inch to much as ⅜ inch at the top, depending upon the dwell time. The resistance of such elements, made from 320 mesh silicon carbide powder and no alumina, a laser operated at 250 watts CW and a spot size of about 0.08 inch in diameter, has varied from 0.5 ohms per linear inch to 100 ohms per linear inch. The width can be changed by simply changing the table speed. By making the element wide at the terminals, it is possible to use aluminum, which melts at about 1300° F. for contacts on heating elements which are expected to heat to 2800° F. in their hottest portions. There appears to be a practical limit to the minimum cross-sectional area of an element. This minimum cross-section would be set by mechanical strength considerations of the heating element. The larger cross-sectional areas tend to be much stronger than the smaller cross-sectional areas. The maximum cross-sectional area depends not only on the dwell time of the laser beam, which is limited by the maximum temperature to which the particles of silicon carbide can be raised without decomposition or sublimation, but also by the energy of the beam. A laser operating at 500 watts CW can be expected to produce a wider or deeper element, of greater cross-sectional area, than a laser operating at 250 watts CW with the same table speeds or dwell times. The higher power, with the same dwell time, will dictate the use of larger particle sizes. Thus, while it would appear that the lowest average particle size of silicon carbide to produce a practical heating element with a carbon doxide laser beam is larger than 12 microns, the largest useful average particle size will depend upon the power of the laser.

The method of forming silicon carbide-alumina shapes which has been described above, is simple, extremely versatile and permits an almost infinite variety of shapes to be produced, which can either have a top surface lying substantially in a single plane, or by contouring the exposed surface of the bed, can even be contoured in other dimensions.

In using the laser process described, the area of impingement of the beam is small, and the particles remain within the area of impingement of the beam for a time period measured in seconds or fractions of seconds. The length of time required to form a complete heating element, using a laser or an equivalent localized uncharged energy beam source, will be a product of the total length of the heating element and the rate of movement of the beam and powder relative to one another.

Examples of uncharged energy beams which may, under suitable circumstances, be used, are solar energy and rays from a short arc, high pressure mercury vapor lamp, focused to a fine point. The carbon dioxide laser beam does have the great advantage of producing energy of a wave length which is absorbed with great efficiency by silicon carbide.

In using a laser or a localized uncharged energy beam source, the area of impingement of the beam can be thought of as the area of high beam energy bounded by a closed isoenergetic line at every point outboard of which the beam energy is less than half the maximum. The energy distribution within the laser beam is gaussian.

The product described as the illustrative preferred embodiment has utilized aluminum oxide as the electrical resistivity modifying agent, and the method has been described as applied to the production of shapes containing 0–25% alumina.

Other electrical resistivity modifying agents can be used and for certain applications have greater utility than alumina. Molybdenum disilicide, for example, provides a resistance element with a strongly positive temperature coefficient of resistance, produces a stronger shape than an equal amount of alumina and adds stability to the element during prolonged high temperature operating life. Thus, silicon carbide alone, in some undensified shapes having a deep valley, tends to split along the valley after one hundred hours or so of operation at 2800° F., and to decrease in temperature at constant wattage to around 2000° F. These problems are eliminated or minimized by the addition of molybdenum disilicide, or by the operation of the element at temperatures below 2000° F. The initial resistance of a shape containing five percent molybdenum disilicide for example is substantially lower than that of a shape containing even three percent of alumina, but for certain applications, this is useful. Furthermore, mixtures of the refractory materials, such as magnesium oxide and molybdenum disilicide produce intermediate results which are desirable in such applications.

Magnesium oxide and zirconium oxide are examples of useful refractory materials which do not soften at the temperature of sublimation of silicon carbide, producing an increased resistance of the resultant shape but a shape of smaller cross-sectional area than either unfilled silicon carbide or silicon carbide filed with a refractory which softens, such as silicon dioxide (silica).

Silicon nitride and magnesium fluoride are also electrical resistivity modifying agents usable to change the resistance of the shape and to impart desirable physical characteristics. Magnesium chloride may be used in place of magnesium fluoride, although the fluoride is preferred.

Silica has been mentioned as a refractory material which softens at a temperature below the sublimating temperature of silicon carbide. It has been treated as a refractory because its melting point in absolute terms is high. Other electrical resistivity modifying agents, such as boron oxide ($B_2O_3$) in the form which melts at approximately 450° C., used in small amounts, e.g. 0.3%, serve as binders, melting, flowing, apparently forming new compounds and producing shapes with larger cross-section than a shape made without such a binder.

Magnesium titanate ($2MgO.TiO_2$) may be used both to stabilize the heating element and to increase its resistance as compared with that of an element which contains no electrical resistance modifying agent or which contains molybdenum disilicide.

Figure 6:
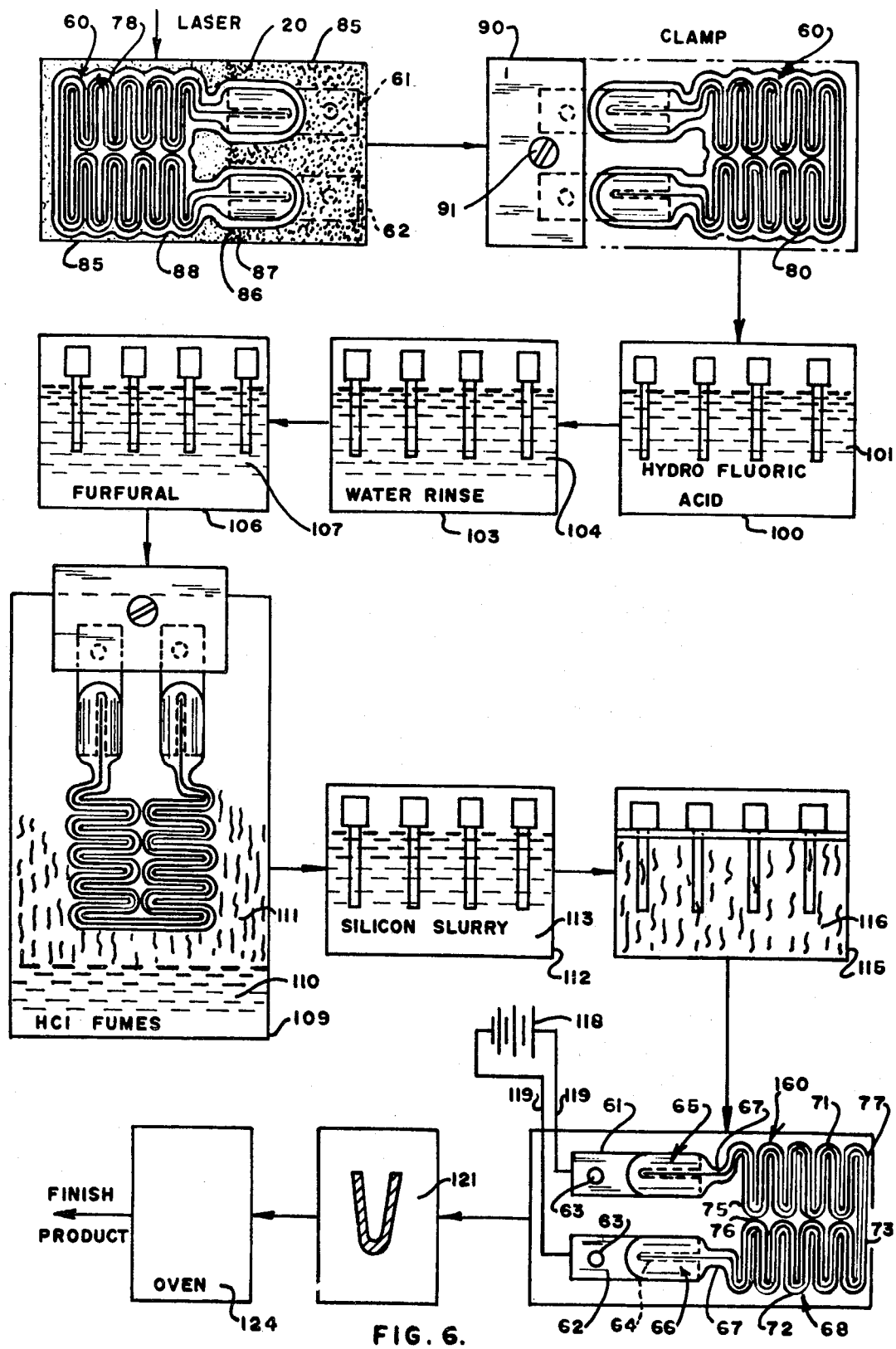
FIG. 6 is a flow sheet, partly diagrammatic in nature, showing steps in the formation of an igniter of this invention.
Figure 7:
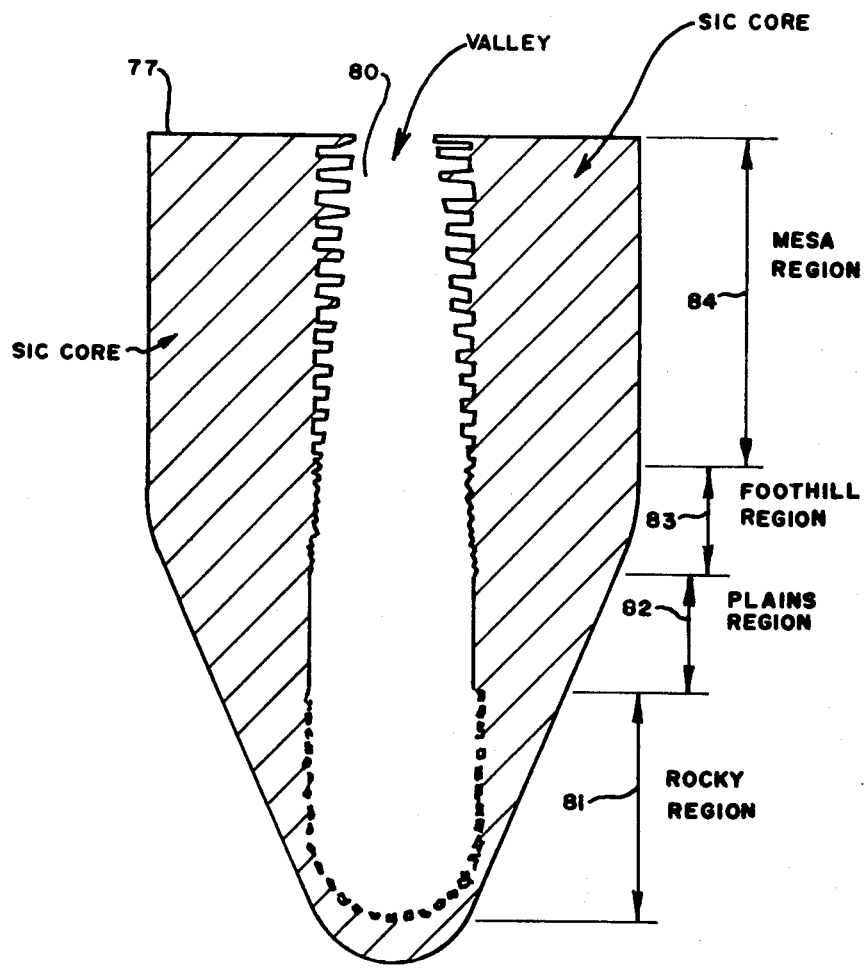
FIG. 7 is a sectional view transversely of a hot zone portion of the igniter illustrated in FIG. 6.
Figure 8:
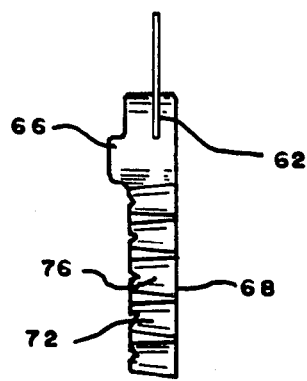
FIG. 8 is a view in side elevation of a finished igniter.

Referring now to FIGS. 6, 7 and 8 for one illustrative embodiment of shape of this invention used as an igniter, and the method of making it, reference numeral 60 indicates an igniter in the process of being made, and reference numeral 160 the finished igniter. The igniter 60, particularly as shown in the lower right hand corner of FIG. 6 has the same appearance in top plan view as the finished igniter 160. The igniter 160 has contacts 61 and 62, which in the embodiment shown, are flat strips of tantalum metal, provided with a mounting hole 63 near one end and a slot 64 at and extending through the edge of the opposite end from the contact hole 63. The shape itself has contact zones 65 and 66, in which a part of the contacts 61 and 62, respectively, are embedded, bridging sections 67, and a hot zone 68. The hot zone 68 is made up of two serpentine sections 71 and 72, and a connecting section 73. Each of the serpentine sections 71 and 72 is made up of a series of U-shaped members consisting of straight reaches and connecting reaches 76.

The igniter 160 has a core 77, and, in its initial stages, a rind 78. In its final condition, the rind 78 has been removed.

The igniter has a valley or groove 80 in it which, in the embodiment shown, is deep and narrow compared with the valley 3. The valley 80 exhibits characteristics which are peculiar to the shapes formed by the use of a laser, and while those characteristics in the valley 80 are more pronounced, the valley 3 exhibits the same general characteristics. A shape formed by use of a laser beam as described with respect to any of the embodiments is identifiable as having been made by that method by the characteristics of the valley, as well as by the existence of the rind.

Referring to FIG. 7, the interior wall of the valley or groove is characterized by four distinct regions, a rocky region 81, in which relatively large granules line the wall, a plains region 82 in which the wall is relatively smooth, a foothill region 83 in which the surface of the wall has a somewhat serrated profile, and a mesa region at which the serrations become squarer in section and fingerlike, all as shown in FIG. 7. It has been found, that in spite of the thinner section produced by a concentrated beam of small diameter, the shape produced in the way described hereinafter in which the igniter is formed is somewhat stronger than the shape produced by a relatively wide, somewhat more diffused beam as described in connection with the formation of the range heater element.

Referring now to FIG. 6, the igniter of this illustrative embodiment is made from two silicon carbide mixtures, a contact zone mix and a hot zone mix. In the illustrative embodiment described, a boat or open-topped container 85 is first partitioned transversely by a thin separater of cardboard or the like, placed along a line indicated by reference numeral 86 in the upper lefthand corner of FIG. 6. A contact zone mix is poured into the container on the right side of the partition as viewed in that Figure and a hot zone mix into the container on the left side. Tantalum contacts 62 are buried at the appropriate depth with their slots 64 nearer the separator, the mix on each side of the barrier is smoothed and made level, and the barrier removed, leaving a line of demarcation between the two mixes, which are, however, in intimate contact at the interface between them, leaving no discontinuity.

In the illustrative embodiment shown and described, the hot zone mix is made up of 2%, by weight of the total mix, of silicon powder, 325 mesh. The remaining 98% is silicon carbide green grit, 240 grit powder. The contact zone mix is made up of 50%, by weight of the entire mix, of aluminum powder between 100 and 200 mesh, 10% by weight, 325 mesh silicon powder and 40% by weight, 180 mesh green grit silicon carbide.

In practice, a bed of the contact mix is smoothed at a known distance below the ultimate bed height, the tantalum contacts are laid on the smooth bed, the remainder of the contact mix sufficient to bring the height of the bed to the ultimate desired height is added, and the bed is smoothed before the barrier is pulled. The slot in each tantalum contact extends longitudinally of the elongated contacts and extends through one end. That open end is oriented toward the hot zone mix, and the slots in the two contacts are oriented parallel with one another. The contacts are, of course, spaced laterally from one another.

The loaded boat is then placed on a programmed x-y table in a precise position with respect to a laser beam which is to impinge upon the surface of the bed. The laser is of the $CO_2$ type with a usable energy of 250 W.

A 5" focal length lens is used which focuses the beam to approximately 10 mils in the bed surface.

The shutter of the laser is opened and the table's motion is started simultaneously, the beam striking the bed in the contact zone directly above the slot of one of the tantalum contacts. The table is programmed to move relatively slowly (on the order of one and one-half inches per minute), first through the area of the slot, which is substantially coterminous with the contact zone mix, and then through a portion of the hot zone mix to form a bridging zone between the contacts and contact mix and the hot zone mix and serpentine igniter element. The aluminum in the contact mix absorbs energy from the laser beam which results in the formation of a wider but less deep mass of the igniter element. Both the aluminum and the silicon tend to wet the tantalum and form a solid bond between the silicon carbide and the tantalum through the contact zone. As the laser beam moves into the hot zone mix at the initial slow speed, some aluminum tends to be carried over, which produces a short area of intermediate depth and slightly greater width, but the continued movement of the laser beam at the slow speed produces a bridging section of approximately twice the depth of either the contact area or, as will be described, of the hot zone area of the igniter. This bridging area of substantially greater depth serves to minimize and in practice eliminate a hot spot which would otherwise be a problem at the juncture of the contact zone and the serpentine igniter zone. As will be described hereinafter, the bridging zone also serves as a separating means between the contact zone and the serpentine igniter zone during a densification process. In the illustrative embodiment described, the straight reaches of the serpentine zone are made at a relative rate of travel of the table, hence the boat, and beam of eight inches per minute, the turns, at somewhat different slower, rates, as now described.

After a predetermined linear travel of the boat relative to the laser beam through the contact and bridging zones, the first of many 90° turns is made. Each 90° turn consists of two 45° turns. At the first change of direction, the table is programmed to turn so that the boat is moved to produce a 45° bend through which the rate of travel of the boat and beam with respect to one another is increased from the slow speed at which they moved through the contact and bridging sections to an "intermediate" speed which is 20% less than the eight inches per minute in the straight reaches of the serpentine zone. The rate remains at the intermediate speed through the next 45° bend, which completes a 90° turn of the serpentine. After a short distance of travel in the new direction at the slow speed, the table assumes its higher speed (eight inches per minute) through the x or y reach, as the case may be, until the first 180° bend is approached.

The table again turns so that the boat is moved to produce a 45° bend through which the rate of travel of the boat and the beam with respect to one another is reduced to the intermediate speed until the 45° bend is completed. The table again moves to produce another 45° bend which completes a 90° turn of the serpentine element. After a short distance of travel in the new direction at the intermediate speed, the table resumes its higher speed through the x or y reach, as the case may be, a short distance, when the table again moves to produce another 45° bend at the intermediate speed. The table again moves to produce another 45° bend at the intermediate speed, which completes the first of the connecting reaches 76. The table then resumes its higher speed in a straight line to produce the first of the complete straight reaches, until another U-shaped intermediate area is reached, when the process of turning at 45°, etc., is repeated, as will be immediately apparent from a top plan view of the igniter. As a result of the slowing of the rate of travel of the boat as indicated, an area around each bend is produced which is somewhat deeper, and therefore has somewhat more strength than the remaining portions of the reaches of the serpentine as shown particularly in FIG. 8.

When the desired number of back and forth passes have been made to form one side of the serpentine element, the table is instructed to produce a cross reach 73 of predetermined length, which in effect shifts the table laterally and begins a serpentine return reach toward the contact zone and the tantalum contact spaced from the first contact. The process is then reversed in that at the last reach of the serpentine element to be formed, the speed of the table relative to the beam is not only reduced on the bend, but remains reduced and in fact is slowed to the speed at which the bridging piece from the first contact was made to form another bridging piece, and to move directly into the contact mix to secure the contact in the same way as the first contact was secured.

The resulting element is now in the form of a core with a thin but deep valley in it, and, surrounding the core on all of the surfaces except the top surface on which the beam impinged is the relatively thick rind 78.

In the particular illustrative embodiment of igniter shown and described, the length of the hot zone after the rind is removed is approximately one and a quarter inches, the width approximately one and three eights inches, the side to side width of the core at the valley side approximately three thirty seconds of an inch, the valley center to valley center distance along the straight reaches of the serpentine approximately one eighth of an inch and the distance between facing connecting reaches, approximately one sixteenth of an inch.

In this embodiment, the reaches of the core are so close together and the core itself is of such fine width, that the rind, which is of about the same width as the core, where its formation is unobstructed, actually forms a continuous mass, so that the serpentine, when lifted from the bed, is in the form of a solid rectangular mass of what appears to be silicon carbide. This affords an opportunity to clamp the contacts in a fixture, in this embodiment a two-plate clamp 90, with a connecting-tightening screw 91, while the rind is serving as built-in support for the core, and the remaining steps of the process can all be carried out with the contacts clamped in the fixture.

It has been found that the rind is distinguished from the core by being bonded by quartz rather than by a regrowth of silicon carbide. Accordingly, it has been found that by submersing the element in hydrofluoric acid, the rind is removed readily, falling from the core without any mechanical abrasion. The hydrofluoric acid also removes from the valley any quartz crystals which may have formed in it. This is indicated diagrammatically in the third figure of the flow sheet, in which a plurality of igniter elements, each clamped in a fixture, are shown immersed in a tank 100 of hydrofluoric acid 101.

The igniter element at this stage is self-supporting, but it is relatively porous and it has been found that if it is used in this condition, the access of oxygen to the porous element permits oxygen to diffuse through the silicon carbide and in the use of the element, at the elevated temperatures, to form silicon dioxide (quartz) which increases the resistance, an undesirable result.

Accordingly, the element is densified as follows. After a water rinse indicated in the fourth of the figures in the flow sheet, which shows water 104 in a tank 103, to remove the hydrofluoric acid, the element is dried, a step not illustrated on the flow sheet, and is then submersed, up to the contact area, in furfural 107 in a tank 106. After the excess furfural has dripped off, the element is subjected to HCl fumes 111, as shown in the sixth of the figures in the flow sheet, where hydrochloric acid 110 is contained in a tank 109. The hydrochloric acid fumes reduce the furfural to carbon, putting carbon in all the pores. The process of dipping in furfural and carbonizing is preferably repeated several times until the element is thoroughly impregnated.

As indicated in the seventh figure of the flow sheet, the element is then coated with silicon, preferably by making a slurry 113 of 325 mesh silicon and water and dipping the element into the agitated slurry in a tank 112. The element is then permitted to dry. This forms a layer of silicon on the outside, along with the layer of carbon which has been produced by the carbonizing of the furfural. It will be recalled that the hot zone mix contains in the neighborhood of 2% silicon, and that much of the silicon remains in the body of the igniter at this point.

The serpentine portion of the igniter is now introduced into an induction furnace 115 which consists of an induction coil, within which is a carbon receptacle in the form of an open-ended box, and heated in an inert (argon) atmosphere 116 to the order of 4000° to 5000° F. In practice, the receptor temperature has been approximately 4500° F. At this temperature and under these conditions, the carbon reacts with the silicon to form silicon carbide. The silicon melts at approximately 2600° F. and flows into any pores which have not been filled by the carbon, so that the reaction of the carbon and the silicon, both the silicon which has been in the body from the time it was first made and the silicon which has flowed into the pores from the outside, produces a dense silicon carbide body within the entire serpentine area of the igniter.

The densification has two virtues. First, by excluding oxygen from the pores, it produces a stable element the resistance of which changes slowly (certainly within commercial acceptable limits) with continued use. Second, it forms a much stronger unit physically. The presence of the valley in the shape enables the shape to be densified more effectively. The newly formed densifying silicon carbide tends to fill at least a part of the valley and to smooth to some extent the contours of the different regions of the valley.

To produce a commercial product, the igniter is now seasoned by applying a voltage from a source shown diagrammatically at 118, through conductors 119 electrically connected to the contacts to heat the igniter to 2800° F. to stabilize the igniter. It is then moved to a coating station 121 and provided with a backing coat of what is commercially known as Mullkote, a product of Babcock and Wilcox, to which is added 10% to 15% of anhydrous $B_2O_3$. Mullkote itself is a mullite, $3Al_2O_3 \cdot 2SiO_2$.

A slurry of the Mullkote and $B_2O_3$ is made, to the consistency of a paste, the element is coated with the paste on the surface of the serpentine except for the valley and top surface. The coated element is then cured in an oven 124 at about 3000° F. to harden the backing, and the igniter is then ready for commercial use.

Numerous variations, in the shapes and method of their production within the scope of the appended claims will occur to those skilled in the art in the light of the foregoing disclosure. Merely by way of example, the ends of the igniter described can be metallized instead of having metal contacts embedded therein, in which case it is not necessary to use a contact mix of different composition from the hot zone mix, and contacts can be embedded in other shapes for range heating elements and the like. Other metals, as for example Columbium, can be used for the contacts. The shapes can be made in any other desired configuration, as for example with one serpentine section and an L-shaped cross and return reach in an igniter, a doubled spiral in a range heating element, an elongated single section serpentine form with contact ends oppositely disposed, in a cartridge heater, or a serpentine with long straight reaches in a duct heater. Electrical resistivity modifying agents can be added to the mix or mixes of any shape, including those used as igniters. For example, the addition of boron oxide in an amount of 0.3 to 0.5% to the igniter mix or mixes strengthens both the rind and core of the shapes and makes the delineation of the core and rind sharper. The amount of silicon in the igniter hot zone mix of the preferred embodiment can be varied, amounts up to 5% giving satisfactory results in the process described. In those shapes in which metal contacts are incorporated, it is desirable to use a metal powder such as aluminum powder and silicon powder in a contact zone mix to ensure wetting of the contacts and adherence to the metal contacts by the silicon carbide, or else to precoat part of the metal contacts with a heavy layer of suitable powder containing a wetting metal and silicon. These variations are merely illustrative.

Having thus described the invention what is claimed and desired to be secured by Letters Patent is:

1. In an electrical resistance heating element comprising a heating member formed of silicon carbide and at least one electrical contact held to said heating member, the improvement wherein a part of said contact is embedded in said silicon carbide and is bonded to said silicon carbide by said silicon carbide, and wherein said contact is a metal strip and including at least one opening in said contact, said silicon carbide extending into said opening and forming an interference fit with said contact.

2. The heating element of claim 1 wherein said opening in said contact comprises a slot extending through one edge of said contact, and wherein said silicon carbide extends through said slot.

3. The heating element of claim 1 wherein said heating member has an elongate hot zone and a pair of flanking contact zones formed in one piece with said hot zone, said hot zone consisting essentially of silicon carbide particles bonded by regrown silicon carbide and having opening through one elongated surface a central groove, said groove being continuous and following the elongated configuration of said surface through which said groove opens, said groove being deep relative to its width, said contact zones differing from said hot zone in at least one of cross-sectional area and composition.

4. The element of claim 3 wherein said electrical contacts are embedded in two ends of said heating member in said contact zones and project therefrom.

5. The element of claim 4 wherein said hot zone has been densified with silicon carbide formed in a porous matrix of silicon carbide.

6. The element of claim 4 wherein said surface through which said groove opens is substantially planar.

7. The element of claim 3 wherein said hot zone is wider in cross-section at said surface than adjacent the bottom of said groove.

8. The element of claim 3 wherein said hot zone is formed as a loop, said contact zones being generally parallel to each other.

9. In an electrical resistance heating element comprising a heating member formed of silicon carbide and at least one electrical contact held to said heating member, the improvement wherein a part of said contact is embedded in said silicon carbide and is bonded to said silicon carbide by said silicon carbide, and wherein said heating member contains an electrical resistivity modifying agent.

10. The element of claim 9 wherein said electrical resistivity modifying agent is taken from the class consisting of oxides, silicides, nitrides and halides.

11. In an electrical resistance heating element comprising a heating member formed of silicon carbide and at least one electrical contact held to said heating member, the improvement wherein said contact is a metal strip and wherein at least one opening is provided in said contact, said silicon carbide extending into said opening and forming an interference fit with said contact.

12. The heating element of claim 11 wherein said opening in said contact comprises a slot extending through one edge of said contact.

13. The heating element of claim 12 wherein said contact is embedded in said heating member and wherein said silicon carbide extends through said slot in said contact.

* * * * *